June 16, 1964  L. H. WEINAND  3,137,552
AIR CLEANER ASSEMBLY
Filed Feb. 9, 1962  2 Sheets-Sheet 1

INVENTOR.
Louis H. Weinand
BY
George A. Schmidt
ATTORNEY

United States Patent Office 3,137,552
Patented June 16, 1964

3,137,552
AIR CLEANER ASSEMBLY
Louis H. Weinand, Warren, Mich., assignor to General Motors Corporation, Detroit, Mich., a corporation of Delaware
Filed Feb. 9, 1962, Ser. No. 172,209
6 Claims. (Cl. 55—407)

This invention relates to air cleaner assemblies, and more particularly to a centrifugal air cleaning device for removing contaminants from air for conveyance to an induction system.

In the design and manufacture of structures such as internal combustion engines it is necessary to supply air to the engine to be mixed with a fuel to permit combustion and subsequent driving of the engine. The air must be cleaned before it is passed through the induction system in order to remove any impurities or contaminants that might exist in the air that would harm the engine. The air cleaner assembly is one of the more important accessories contributing to long engine life. This is particularly true in applications where the engine is continuously subjected to adverse dust conditions, such as encountered by earth moving equipment and automotive vehicles operating in arid regions.

Presently available air cleaner assemblies may not operate efficiently under adverse conditions, particularly under conditions as above set forth where the equipment may be operating in arid regions or in extremely dusty conditions. The usual air cleaner assembly places a simple filter element in the air path to trap the impurities, requiring the filter to be cleaner and/or changed periodically. Cyclone type air cleaners have been used under such conditions wherein the incoming air is rotated and impurities are caused by centrifugal force to move to the outside and are in some way removed from the air. Most centrifugal type air cleaners are extremely complicated and cumbersome affairs requiring many parts and constant attention in order to maintain efficiency.

The device in which this invention is embodied comprises, generally, a cyclone type air cleaner assembly having rotating guide vanes properly designed to remove the dust and impurities from the rotating air at the outside of the rotating machine. A drive means is provided to rotate the vane carrying rotor, and suitable suction means are provided to remove the dust from the dust collection chamber after it is separated from the cleaned air.

This device removes dirt and dust particles from the ambient air in a more efficient manner than has heretofore been possible. The device is relatively simple to manufacture and assemble and is adapted to a wide variety of uses.

These and other advantages will become more apparent from the following description and drawings, in which.

Figure 1:
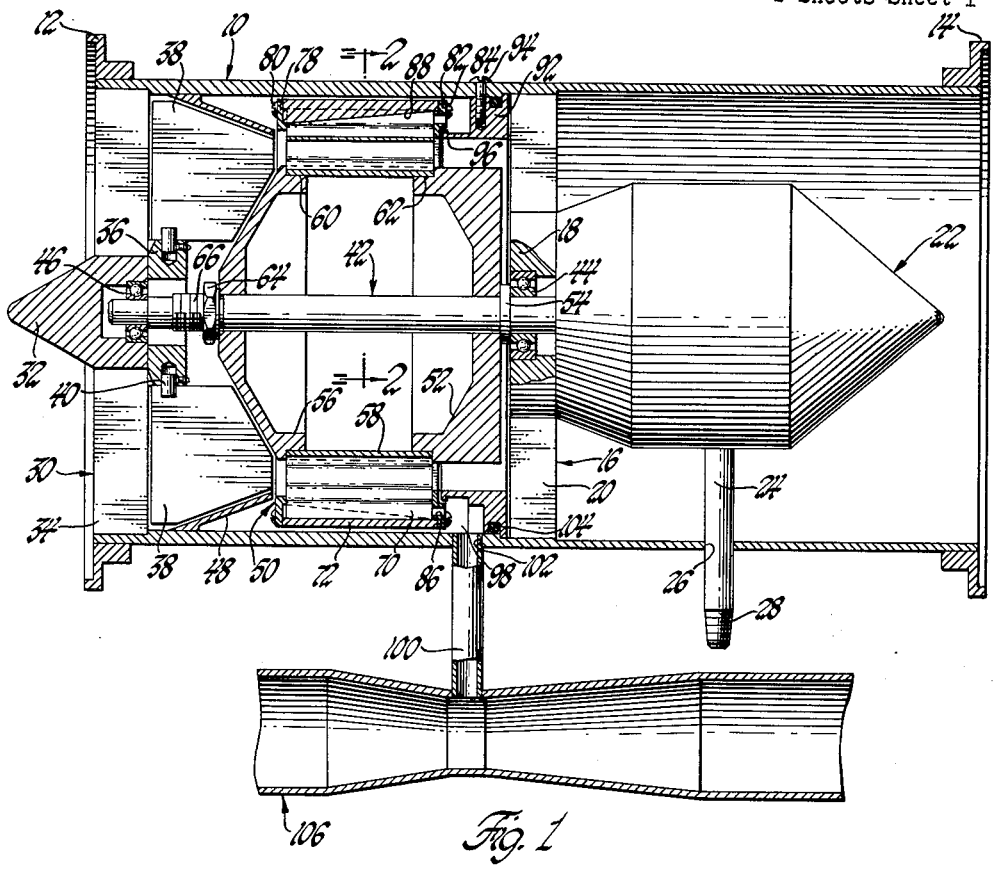
FIGURE 1 is a view with parts broken away and in section of a cyclone type air cleaner assembly illustrating the position of the various parts.
Figure 2:
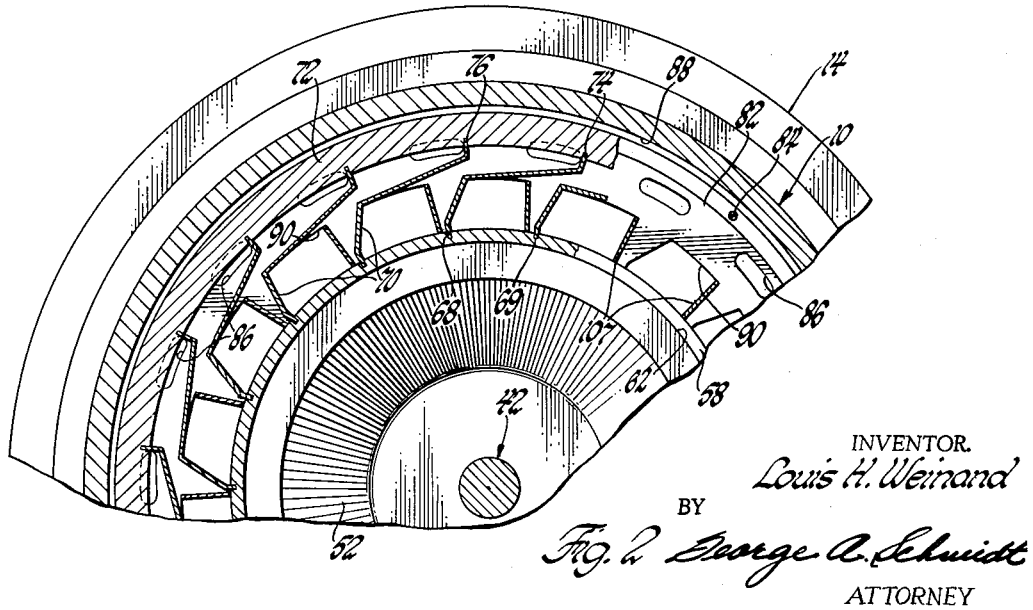
FIGURE 2 is a partial cross-sectional view of the assembly illustrated in FIGURE 1, taken substantially along the line 2—2 of FIGURE 1 and looking in the direction of the arrows.

Referring more particularly to the drawings, FIGURES 1 and 2 best illustrate the overall air cleaner assembly.

An outer cylindrical case or housing, illustrated generally by the numeral 10, is provided with mounting flanges 12 and 14 at each end thereof. Flanges 12 and 14 provide a means for mounting the air cleaner assembly relative to an engine or other structure. A central webbed mounting plate, illustrated generally by the numeral 16, is located within the case or housing 10 and includes a central hub portion 18 and a plurality of radially extending webs 20 which engage the inner wall of the housing 10. Support member 16 serves as a mounting means for a drive motor 22 which may be of any suitable nature. As illustrated in FIGURE 1, drive means 22 may be an air operated device with an air inlet conduit 24 extending through a suitable aperture 26 in the housing 10. Conduit 24 may be threaded as at 28 to receive an air connection. Similarly, drive means 22 may be an electric motor or any other suitable device.

Secured in the front end of housing 10 is a webbed support member, illustrated generally by the numeral 30, which includes a central nose or hub 32 and a plurality of radially extending webs 34 which engage the inner wall of the housing 10. Secured to the support member 30 is a ring 36 which in turn supports a plurality of air deflectors 38. Deflectors 38 may be provided with any suitable attaching means, such as dowels 40. Deflector plates 38 are angularly disposed relative to the axis of the housing 10 and are provided to impart a swirling or rotary motion to the air entering the housing 10 from the left, as viewed in FIGURE 1.

Extending from drive means 22 and toward the front support member 30 is a shaft, illustrated generally by the numeral 42. Shaft 42 is driven by drive means 22 and is supported in the intermediate support member 16 by a suitable bearing 44. The end of shaft 42 is supported in the nose section 32 of support plate 30 by a suitable bearing 46. Shaft 42 is thus free to rotate within the housing 10.

Located adjacent the trailing edges of deflector plates 38 is an annular conical deflector member 48. Member 48 serves to direct the incoming air and to funnel the incoming air to the proper location. Deflector member 48 may be secured in any suitable manner to the inner wall of housing 10.

A rotor assembly, illustrated generally by the numeral 50, is secured on shaft 42 and rotates therewith. Rotor assembly 50 includes a rear end plate 52 which is properly positioned on shaft 42 by a flange 54 formed on the shaft. A front end plate 56 is supported on shaft 42 and is separated from rear end plate 52 by an inner guide vane ring 58. Suitable annular grooves 60 and 62 are formed in the surfaces of front and rear end plates 56 and 52, respectively, to receive the inner guide vane ring 58. A nut 64 received on a threaded portion 66 of shaft 42 secures the two end plates 56 and 52 and the inner guide vane ring 58 against the flange 54 formed on shaft 42.

Inner guide vane ring 58 is provided with a plurality of radial slots 68 around the outer surface thereof. Received and secured in slots 68 are flanges 69 of a plurality of guide vanes 70. Guide vanes 70 may be stamped sheet metal members of generally L-shaped cross-section, as best illustrated in FIGURE 2. The purpose of the particular shape of guide vanes 70 will be later described.

Also rotating with the rotor assembly 50 is an outer guide vane ring 72, provided with a plurality of radial slots 74 around the inner surface thereof. Guide vanes 70 have flanged edges 76 which are received in the slots 74 in a guide vane ring 72. A cover ring 78 is secured, as by machine screws 80, to the outer guide vane ring 72 in order to hold the guide vanes 70 in proper location.

A dust port ring 82 is secured to the outer guide vane ring 72 by machine screws 84, and is provided with a plurality of dust port apertures 86. It is to be noted that outer guide vane ring 72 has a conical inner surface 88 terminating at the radially outward edge of dust ports 86. This serves to direct the impurities in the proper manner.

Dust port ring 82 has a plurality of air outlet apertures 90 formed therein, as best illustrated in FIGURE 2. Each of the air outlet ports 90 is nested beneath an adjacent guide vane 70 in such a manner as to be separated from the dust passage outwardly of the guide vanes 70 so that no dust or impurities pass through the air outlets 90. As the clean air leaves the rotating assembly 50 it passes beneath the webs 20 of the central support plate 16 and to the induction system of the device with which the air cleaner is used.

A retainer ring 92 is secured to the inner wall of housing 10 by any suitable means, as machine screws 94. Ring 92 is provided with an axially extending lip 96 which extends to and approaches the dust port ring 82 of the rotating assembly 50. Retainer ring 92 defines, with the rotating assembly dust ring 82, the lip 96 and the inner wall of housing 10, a dust collection chamber 98. Chamber 98 is annular and communicates with a suitable exhaust conduit 100 received in an aperture 102 in the wall of housing 10. Conduit 100 may be connected to an aspiration system, such as an exhaust manifold 106 of an internal combustion engine. Any suitable exhaust or suction means may be provided.

A seal or O-ring 104 is disposed between the retainer ring 92 and the inner wall of housing 10 to prevent the passage of air therebetween.

The operation of the construction above described is as follows. With the drive means 22 operating, shaft 42 causes the rotating assembly 50 to turn relative to the housing 10, front support plate 30 and deflector members 38. Air enters through the front support plate 30 and is caused by the air deflectors 38 to swirl or rotate relative to the housing 10. The deflector housing cone 48 directs the air to the inlet of the rotating assembly 50, and the centrifugal force of the impurities in the air causes the impurities to ride or slide along the edges of the guide vanes 70 and to the dust outlet ports 86. Conical surface 88 of the outer guide vane ring 72 aids in directing the particles to the dust outlet ports. The air having the impurities separated therefrom passes to the air outlet ports 90 along the inner surfaces of the guide vanes 70. Such air passes through the outlets 90 and through the remaining portion of the housing 10. The dust and impurities are received in the collection chamber 98 where they are removed by suction means 100 and 106.

In order to fully protect the air outlets 90 from any possibility of stray impurities, a series of baffles 107 may be secured in the dust port ring 82 and the inner guide vane ring 58. Baffles 107 extend axially of the inner guide vane ring 58 adjacent the wall of the air outlet ports 90.

Figure 3:
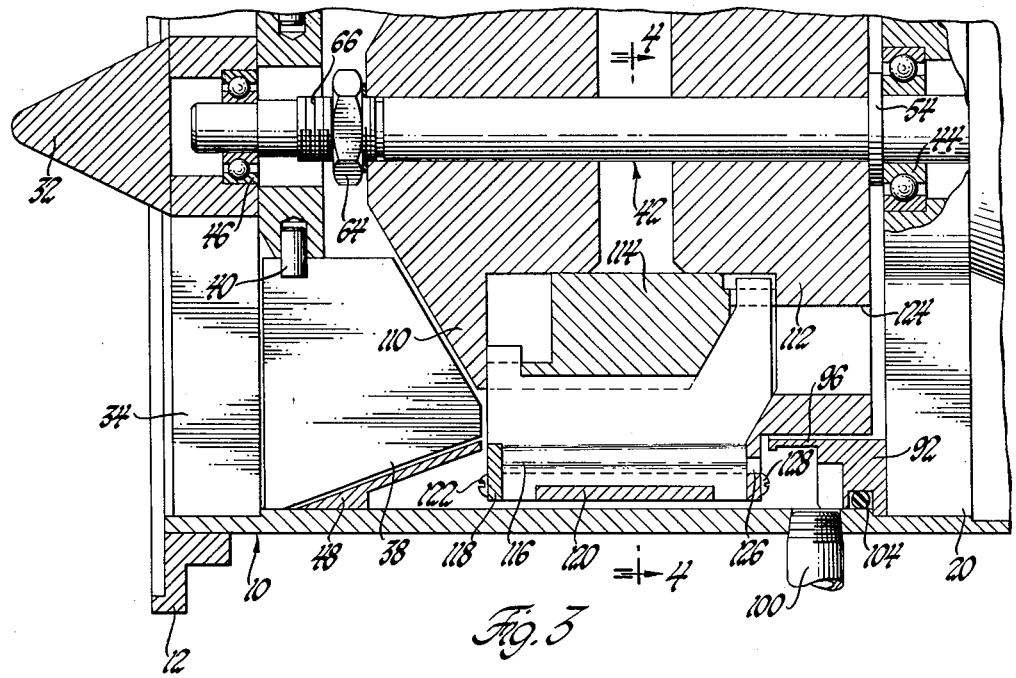
FIGURE 3 is an enlarged portional view of a cyclone type air cleaner assembly, substantially the same as illustrated in FIGURE 1 but with modifications in various parts.

A modification of the above-described construction is illustrated in FIGURE 3 wherein the like parts are provided with the same reference numerals. Mounted on shaft 42 by means of nut 64 and threads 66 are front and rear end plates 110 and 112, respectively. An inner guide vane ring 114 separates the front and rear end plates respectively and supports a plurality of guide vanes 116. A cover ring 118 is secured to the outer guide vane ring 120 by means of machine screws or the like 122.

Rear end plate 112 extends radially outwardly to incorporate a plurality of air outlet ports 124 and a plurality of dust ports 126 circumferentially disposed about the rear end plate 112. End plate 112 is secured to the outer guide vane ring 120 by means of a plurality of machine screws or the like 128.

Figure 4:
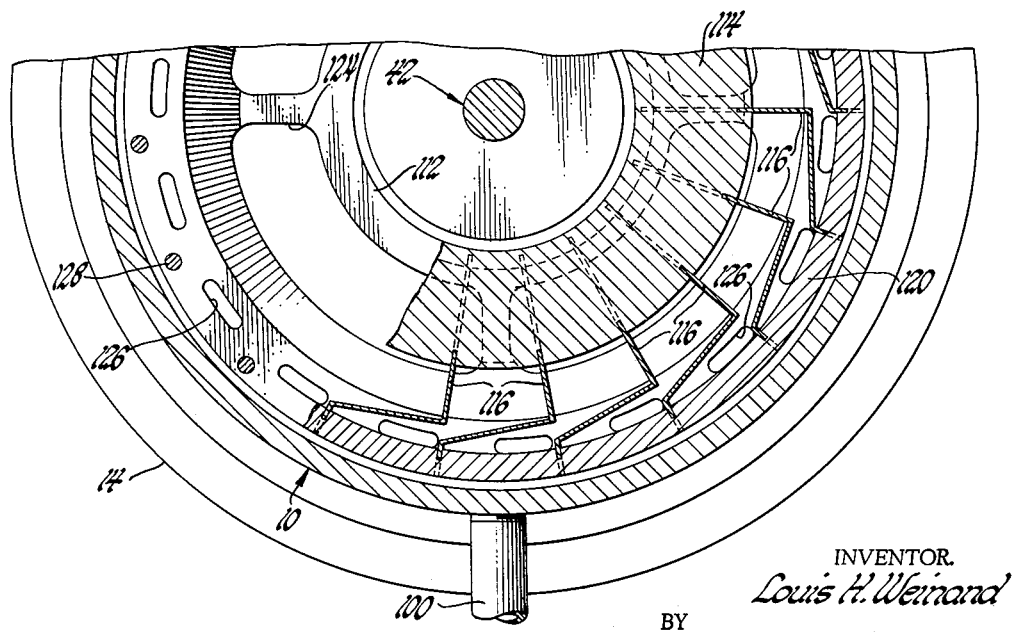
FIGURE 4 is a cross-sectional view of the air cleaner assembly illustrated in FIGURE 3, taken substantially along the line 4—4 of FIGURE 3 and looking in the direction of the arrows.

The remaining parts of the assembly illustrated in FIGURES 3 and 4 are substantially the same and accomplish substantially the same purpose as described with respect to FIGURES 1 and 2. The operation of the device illustrated in FIGURES 3 and 4 is substantially the same. The guide vanes 116 are illustrated to be of no effective longer radial length than those shown in FIGURES 1 and 2 but for purposes of more positive separation of the uncontaminated air, the outlet ports 124 are located more radially inwardly than those in FIGURES 1 and 2. Hence, the dust passing through outlet ports 126 is more widely separated from the air outlet ports 124 which are located radially inwardly of the housing 10 where a cleaner fraction of air may be found. This provides a more efficient dust and dirt separation under more extreme conditions.

In each of the modifications above described the guide vanes 70 and 116 are so formed as to direct the dust parts and the clean air in the most efficient manner. Dust ports 86 and 126 are located at the points of highest dust concentration, i.e., in the outer part of the chamber and near the leading edge of the guide vanes. The cleaned air is removed at the lowest point of dust concentration, i.e., the lower part of the chambers and near the trailing edge of the guide vanes.

Thus an air cleaner assembly of the cyclone type is provided which more efficiently separates dirt, dust and impurities from the incoming air. The air passing through the air cleaner assembly is effectively separated from engine harming impurities to permit better and longer life of the device with which the air cleaner is used. It is seen that the dust particles and impurities are exhausted at the most efficient location and that the air is exhausted at its most efficient location. The device is comprised of relatively few parts which are not difficult to assemble and are not part of a complicated and cumbersome construction.

What is claimed is:

1. A centrifugal air cleaner for separating impurities from air and comprising:

a cylindrical casing having air inlet and outlet ends;

a nose member supported in the air inlet end of said casing and centrally located therein;

drive means mounted in said casing and axially spaced from said nose member;

a shaft extending from said drive means and driven thereby, said shaft being journaled in said nose member;

a plurality of deflector plates radially disposed in said casing and adjacent the air inlet end thereof, said deflector plates being inclined to the direction of air movement and directing the incoming air in a generally circumferential and axial direction to remove turbulence therefrom;

a rotor assembly secured to said shaft and rotatable therewith, said rotor assembly being axially disposed between said deflector plates and said drive means;

a plurality of guide vanes circumferentailly disposed about said rotor assembly, said guide vanes having a generally L-shaped cross-section in a plane transverse to said casing and adapted to receive the incoming air from said deflector plates, the inner edge of said vanes being secured in said rotor assembly and the outer edge of each of said vanes being circumferentially displaced with respect to said inner edge thereof;

an outer ring receiving said outer edges of said guide vanes;

a ring member secured to the air outlet end of said rotor assembly and to said outer ring and having an annular row of apertures therein, said apertures being disposed adjacent said outer edges of said guide vanes and permitting passage of impurities therethrough;

a retainer ring secured in said casing and having a flange extending axially therefrom and terminating adjacent said ring member, said flange defining an annular chamber with the inside wall of said casing, said chamber communicating with said apertures in said ring member;

and aspirator means communicating with said annular chamber to withdraw impurities therefrom separated from the incoming air by centrifugal force and directed to said chamber by said guide vanes.

2. The centrifugal air cleaner set forth in claim 1 wherein said ring member is provided with a second annular row of apertures disposed radially inwardly of said first row of apertures, each of the apertures of said second row of apertures being located adjacent the inner edge of one of said guide vanes to permit passage of clean air therethrough.

3. The centrifugal air cleaner set forth in claim 2 and having a baffle axially disposed adjacent the opposite edge of each of said apertures in said second row of apertures from said guide vanes.

4. The centrifugal air cleaner set forth in claim 1 wherein said outer ring is provided with a frusto-conical inner surface to direct impurities.

5. A centrifugal air cleaner for separating solid impurities from air comprising:

a cylindrical casing having air inlet and outlet ends;

a rotor assembly rotatably supported centrally within the casing between the air inlet and outlet ends, said rotor assembly comprising;

an inner guide vane ring, an outer guide vane ring circumjacent the inner ring and spaced radially outwardly therefrom, a dust port ring supporting the outer ring relative to the inner ring and providing a closure at the air outlet end of said rotor, a plurality of circumferentially spaced apertures formed adjacent the outer periphery of the dust port ring, a plurality of circumferentially spaced air exhaust ports formed adjacent the inner periphery of the dust port ring, said apertures being circumferentially offset with respect to said air exhaust ports in a direction opposite to that of rotor rotation, and a plurality of guide vanes spaced circumferentially between said inner and outer guide vane rings, each said vane extending generally in a radial direction from the inner guide vane ring to the outer guide vane ring along a path first bordering a radial edge of an associated air exhaust port thence generally circumferentially in a direction opposite the direction of rotor rotation and then generally radially again to the outer guide vane ring at a position adjacent the most distant edge of the nearest associated aperture whereby a plurality of air purifying chambers are formed in said rotor assembly.

6. A centrifugal air cleaner for separating solid impurities from air comprising:

a cylindrical casing having air inlet and outlet ends;

a rotor assembly rotatably supported centrally within the casing between the air inlet and outlet ends, said rotor assembly comprising;

an inner guide vane ring, an outer guide vane ring circumjacent the inner ring and spaced radially outwardly therefrom, a plate supporting the outer ring relative to the inner ring and providing a closure for the air outlet end of said rotor, a plurality of circumferentially spaced dust apertures formed adjacent the outer periphery of the plate, a plurality of circumferentially spaced air exhaust ports formed radially inwardly of the plate, and a plurality of guide vanes spaced circumferentially between said inner and outer guide vane rings, each said vane extending generally in a radial direction from the inner guide vane ring to the outer guide vane ring along a path beginning radially inwardly of the air exhaust ports and extending in a generally radial direction to a point between said inner and outer rings thence inclining generally circumferentially in a direction opposite the direction of rotor rotation and then generally radially again to the outer guide vane ring at a position between adjacent dust apertures whereby a plurality of air purifying chambers each having an inner air exhaust port and outer dust aperture associated therewith is formed in said rotor assembly.

References Cited in the file of this patent

UNITED STATES PATENTS

| | | |
|---|---|---|
| 1,232,464 | Houghton | July 3, 1917 |
| 1,415,294 | Baldwin | May 9, 1922 |
| 1,570,040 | Chandler | Jan. 19, 1926 |
| 1,745,950 | Orem | Feb. 4, 1930 |
| 2,393,112 | Lincoln | Jan. 15, 1946 |
| 2,512,401 | Whittaker | June 20, 1950 |
| 2,542,095 | Rouget | Feb. 20, 1951 |
| 2,718,179 | Cram | Sept. 20, 1955 |
| 2,802,618 | Prachar | Aug. 13, 1957 |
| 2,804,163 | Bullock et al. | Aug. 27, 1957 |
| 2,932,360 | Hungate | Apr. 12, 1960 |
| 2,944,632 | Whitmore | July 12, 1960 |
| 3,064,411 | Breslove | Nov. 20, 1962 |